United States Patent
Fossen et al.

(10) Patent No.: US 8,074,280 B2
(45) Date of Patent: Dec. 6, 2011

(54) DETECTION OF UNDESIRED COMPUTER FILES IN ARCHIVES

(75) Inventors: Steven Michael Fossen, Coquitlam (CA); Alexander Douglas MacDonald, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 255 days.

(21) Appl. No.: 12/638,951

(22) Filed: Dec. 15, 2009

(65) Prior Publication Data

US 2010/0095380 A1    Apr. 15, 2010

Related U.S. Application Data

(63) Continuation of application No. 11/828,754, filed on Jul. 26, 2007, now Pat. No. 7,797,746.

(60) Provisional application No. 60/869,710, filed on Dec. 12, 2006.

(51) Int. Cl.
*G06F 11/00* (2006.01)
(52) U.S. Cl. ............... 726/23; 726/22; 726/25
(58) Field of Classification Search .......... 726/22, 726/23, 25
See application file for complete search history.

(56) References Cited

U.S. PATENT DOCUMENTS

| | | |
|---|---|---|
| 5,442,699 A | 8/1995 | Arnold et al. |
| 5,452,442 A | 9/1995 | Kephart |
| 5,907,834 A | 5/1999 | Kephart et al. |
| 6,192,512 B1 | 2/2001 | Chess |
| 6,279,128 B1 | 8/2001 | Arnold et al. |
| 6,393,568 B1 | 5/2002 | Ranger et al. |
| 6,622,134 B1 | 9/2003 | Sorkin |
| 6,711,583 B2 | 3/2004 | Chess et al. |
| 6,789,200 B1 | 9/2004 | Fiveash et al. |
| 6,813,712 B1 | 11/2004 | Luke |
| 6,879,988 B2 | 4/2005 | Basin et al. |

(Continued)

FOREIGN PATENT DOCUMENTS

EP    1377892    1/2004

(Continued)

OTHER PUBLICATIONS

Run-Time Detection of Malwares via Dynamic Control-Flow Inspection; Yong-Joon Park; Zhao Zhang; Songqing Chen; Application-specific Systems, Architectures and Processors, 2009. ASAP 2009. 20th IEEE International Conference on Publication Year: 2009 , pp. 223-226.*

(Continued)

*Primary Examiner* — David Y Jung
(74) *Attorney, Agent, or Firm* — Hamilton, DeSanctis & Cha LLP (57) ABSTRACT

Systems and methods for an anti-virus detection module that can detect known undesired computer files in archives that may be encrypted, compressed and/or password-protected are provided. According to one embodiment, a method is provided for detection of malicious or undesired computer files within an archive without decrypting and without decompressing the contents of the archive. A type and structure of the archive are identified by examining primary or secondary identification bytes stored within the archive. Based on the identified type and structure, descriptive information is obtained from the archive describing contained files within the archive file. The descriptive information for each contained files is evaluated to determine if any are malicious or undesired computer files by comparing the descriptive information to signatures of known malicious or undesired computer files. Finally, an attempt is made to prevent contained files determined to be malicious or undesired from being opened.

26 Claims, 7 Drawing Sheets

U.S. PATENT DOCUMENTS

| | | |
|---|---|---|
| 7,010,689 B1 | 3/2006 | Matyas et al. |
| 7,043,634 B2 | 5/2006 | Wolff et al. |
| 7,349,931 B2 | 3/2008 | Horne |
| 7,448,085 B1 | 11/2008 | Reyes et al. |
| 7,797,746 B2 | 9/2010 | Fossen |
| 2002/0003886 A1 | 1/2002 | Hillegass et al. |
| 2004/0015726 A1 | 1/2004 | Szor |
| 2004/0260636 A1 | 12/2004 | Marceau et al. |
| 2006/0053180 A1 | 3/2006 | Alon et al. |
| 2007/0174362 A1 | 7/2007 | Pham et al. |
| 2008/0141373 A1 | 6/2008 | Fossen |
| 2010/0095380 A1 | 4/2010 | Fossen |
| 2011/0016530 A1 | 1/2011 | Fossen |
| 2011/0023121 A1 | 1/2011 | Fossen |

FOREIGN PATENT DOCUMENTS

| | | |
|---|---|---|
| WO | 02084459 | 10/2002 |
| WO | 2005047862 | 5/2005 |

OTHER PUBLICATIONS

Detection of packed executables using support vector machines; Wang, Tzu-Yen; Wu, Chin-Hsiung; Machine Learning and Cybernetics (ICMLC), 2011 International Conference on; vol. 2; Publication Year: 2011 , pp. 717-722.*

Metaware—An extensible malware detection and removal toolkit ; Chan Lee Yee; Lee Ling Chuan; Ismail, M.; Jumari, K.; Advanced Communication Technology (ICACT), 2011 13th International Conference on; Publication Year: 2011 , pp. 996-1000.*

Sudharsanan, S., "Shared Key Encryption of JPEG Color Images, Consumer Electronics." IEEE Transactions on; vol. 51, Issue 4, Publication Year 2005. pp. 1204-1211.

Li et al., "An Adaptive Scalable Watermark Scheme for High-Quality Audio Archiving and Streaming Applications." Multimedia and Expo, 2005. ICME 2005. IEEE International Conference on Publication Year 2005. pp. 1-4.

Chuan et al. "Automating Uncompressing and Static Analysis of Conficker Worm." Communications (MICC). 2009 IEEE 9th Malaysia International Conference on. Publication Year 2009. pp. 193-198.

"Infectable Objects Part Four—Viruses in Archive Files and Compressed Files", by Robert Vibert, Jan. 10, 2001.

"Advanced Virus Detection Scan Engine and DATs", Copyright 2002, Network Associates Executive White Paper.

"McAfee VirusScan Security Suite", Copyright 2001, McAfee / Network Associates.

"F-Secure Virus Descriptions", Selection of Virus Alerts published by F-Secure, Inc. 2001-2003.

"How to Trick Anti-Virus Systems", Dec. 24, 2003, GovernmentSecurity.org.

"Encrypted Email: Close One Door, Open Another", by Veronica Cuello, Copyright 2001, SANS Institute InfoSec Reading Room.

"About Heuristics", by Stephen Sladaritz, Copyright 2002, SANS Institute InfoSec Reading Room.

"One Virus Engine Is Not Enough: The Case for Maximizing Network Protection with Multiple Anti-Virus Scanners", Copyright 2002, GFI Software.

* cited by examiner

End of Central Directory Record
710

| | |
|---|---|
| end of central dir signature | 4 bytes |
| number of this disk | 2 bytes |
| number of the disk with the start of the central directory | 2 bytes |
| total number of entries in the central directory on this disk | 2 bytes |
| total number of entries in the central directory | 2 bytes |
| size of the central directory | 4 bytes |
| offset of start of central directory with respect to the starting disk number | 4 bytes |
| ZIP file comment length | 2 bytes |
| ZIP file comment | (variable size) |

FIG. 7A

File Header
720

| | |
|---|---|
| central file header signature | 4 bytes |
| version made by | 2 bytes |
| version needed to extract | 2 bytes |
| general purpose bit flag | 2 bytes |
| compression method | 2 bytes |
| last mod file time | 2 bytes |
| last mod file date | 2 bytes |
| crc-32 of uncompressed file | 4 bytes |
| compressed size | 4 bytes |
| uncompressed size | 4 bytes |
| file name length | 2 bytes |
| extra field length | 2 bytes |
| file comment length | 2 bytes |
| disk number start | 2 bytes |
| internal file attributes | 2 bytes |
| external file attributes | 4 bytes |
| relative offset of local header | 4 bytes |
| file name | (variable size) |
| extra field | (variable size) |
| file comment | (variable size) |

FIG. 7B

DETECTION OF UNDESIRED COMPUTER FILES IN ARCHIVES

CROSS-REFERENCE TO RELATED APPLICATIONS

This application is a continuation of U.S. patent application Ser. No. 11/828,754, filed on Jul. 26, 2007, which claims the benefit of priority to U.S. Provisional Patent Application No. 60/869,710, filed on Dec. 12, 2006, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2006-2009, Fortinet, Inc.

BACKGROUND

1. Field

Embodiments of the present invention generally relate to the field of computer virus or malware detection and prevention and systems and methods for detection of malicious or undesired computer files within an archive file. In particular, various embodiments relate to detecting malicious or undesired computer files within a damaged archive that may be encrypted, compressed and/or password protected without breaking the encryption or examining the decrypted contents of the files.

2. Description of the Related Art

Several recent computer malware programs have been distributed inside encrypted archive files, as a means of evading detection by anti-virus programs or gateways. An archive generally refers to a computer file containing one or more files, each of which may be compressed or encrypted. Malware generally refers to malicious software, and is used here to include all undesired computer files.

Typically, the archive is distributed as an attachment to an email that contains the decryption password. The email is crafted to manipulate the reader into using the password to extract the malicious file and then open it.

When malware is distributed inside an encrypted archive, the problem of detection is made much more difficult. The detection methods currently in use have serious shortcomings. For example, one existing method detects the malware when it is extracted from the archive. This method is not useful on gateway products, only on client machines, and is unusable when scanning archive files on disk drives without opening them. Another existing method uses a password recovery algorithm to find the password, decrypt the archive and scan the files. This method is very slow. Another problem with both of these prior methods is that legitimate archives are opened and privileged information contained within them could be exposed.

SUMMARY

Systems and methods are described for an anti-virus detection module that can detect known undesired computer files in damaged archives that may be encrypted, compressed and/or password-protected. According to one embodiment, a method is provided for detection of malicious or undesired computer files within an archive file. Without decrypting and without decompressing the contents of the archive file at issue, the method involves identifying a type and associated structure of the archive file, obtaining descriptive information from the archive file, evaluating the descriptive information and prevention measures. A type and associated structure of the archive file are identified by examining (i) primary identification bytes stored within the archive file that contain information intended to identify the type of the archive file or (ii) secondary identification bytes stored within the archive file that contain identifiable data intended for a purpose other than identifying the type of the archive file. Then, based on the identified type and the associated structure, descriptive information is obtained from the archive file describing one or more contained files within the archive file. The descriptive information for each of the one or more contained files is evaluated to determine if any of the one or more contained files are malicious or undesired computer files by comparing the descriptive information to signatures of known malicious or undesired computer files. Finally, an attempt is made to prevent the one or more contained files determined to be a malicious or undesired computer file from being opened.

According to one embodiment, a method is provided for detection of malicious or undesired computer files within a damaged archive file. A damaged archive file is received. And, without decrypting and without decompressing contents of the damaged archive file, an anti-virus detection module identifies a type and associated structure of the damaged archive file by assuming each of multiple possible archive file types in turn and searching all of or certain parts of the damaged archive file for descriptive information consistent with a current archive file type. Based on the identified type and the associated structure, descriptive information is obtained from the damaged archive file describing one or more contained files within the damaged archive file. Then, the descriptive information for each of the contained files is evaluated to determine if any of the contained files are malicious or undesired computer files by comparing the descriptive information to signatures of known malicious or undesired computer files. Finally, an attempt is made to prevent any of the contained files determined to be a malicious or undesired computer file from being opened.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for an anti-virus detection module that can detect known undesired computer files in archives that may be encrypted, compressed and/or password-protected. According to one embodiment, a goal is to detect encrypted malware files in archives rapidly and accurately without decrypting, decompressing or otherwise subverting the security features of those files. In order to accomplish this, certain pieces of information contained in the archive header or internal central directory may be extracted and compared with corresponding information for known undesired files. If a match is found, the archive may be blocked or quarantined and a notification may be issued to a user or administrator. In this manner, various problems of the currently used methods are avoided. Detection is accomplished quickly and with certainty. Legitimate files can pass unmolested, and will not be decrypted or their contents directly examined. Another advantage of various embodiments of the present invention is that malware in damaged or incomplete archive files can usually be detected.

Importantly, although various embodiments of the anti-virus detection module and methodologies are discussed in the context of a network gateway, they are equally applicable to client workstations, servers and other virtual or physical network devices or appliances that may be logically interposed between client workstations and servers, such as firewalls, network security appliances, email security appliances, virtual private network (VPN) gateways, switches, bridges, routers and the like.

Furthermore, while, for convenience, various embodiments of the present invention may be described with reference to detecting encrypted files in the two most commonly used archive formats by malware authors (i.e., ZIP and RAR), the present invention is equally applicable to unencrypted files contained within archives and various other archive formats, including, but not limited to: 7-Zip, 7zX, WinACE, ARC, ALZip, ARJ, Cabinet, Compact Pro, Disk Archiver, DiskDoubler, DGCA, Disk Image, GCA, WinHKI, ICE, Jar, KGB Archiver, LHA, LZX, Part Image, PAQ, PeaZip, PIM, RK, WinRK, sea, StuffIt, SQX, tar with gzip, compress, bzip2, or lzma, UHarc, Universal Image Format, zoo and Zzip. Embodiments of the present invention are also applicable to self extracting archives, installation archives that are installed by other user or system software and to executable installer files. In general, embodiments of the present invention may be used to evaluate any file contained in another file, where the containing file includes suitable descriptive information for the contained file. By way of example, suitable information would be any set of one or more pieces of information that can identify the contained file with an acceptably high degree of probability. In the preferred case, this information would include at least hash values and sizes for the compressed or uncompressed contained file(s), but if these are not present other sets of information can be used, if the required degree of certainty can be achieved.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

TERMINOLOGY

Brief definitions of terms used throughout this application are given below.

The term "archive" or the phrases "archive file" or "containing file" generally refer to a computer file containing one or more files, each of which may be compressed and/or encrypted.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrase "contained file" generally refers to a file contained within an archive.

The phrase "content filtering" generally refers to performing monitoring or scanning of files and/or other data transfer between a client and a server, such as malware scanning, filename pattern blocking, confidential information control and the like.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

The phrase "network gateway" generally refers to an internetworking system, a system that joins two networks together. A "network gateway" can be implemented completely in software, completely in hardware, or as a combination of the two. Depending on the particular implementation, network gateways can operate at any level of the OSI model from application protocols to low-level signaling.

If the specification states a component or feature "may", "can", "could", or "might" be included or have a characteristic, that particular component or feature is not required to be included or have the characteristic.

The term "proxy" generally refers to an intermediary device, program or agent, which acts as both a server and a client for the purpose of making or forwarding requests on behalf of other clients.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible.

The phrase "transparent proxy" generally refers to a specialized form of proxy that only implements a subset of a given protocol and allows unknown or uninteresting protocol commands to pass unaltered. Advantageously, as compared to a full proxy in which use by a client typically requires editing of the client's configuration file(s) to point to the proxy, it is not necessary to perform such extra configuration in order to use a transparent proxy.

Overview

According to one embodiment of the present invention an anti-virus detection module is used to evaluate one or more files contained within another file, i.e., the archive or containing file, where the containing file includes suitable descriptive information for the contained file(s). Such suitable descriptive information generally includes any set of one or more pieces of information that can identify the contained file(s) with an acceptably high degree of probability. Preferably, such information includes at least hash values and sizes for the compressed or uncompressed file(s). But, if one or more of these pieces of information are not present, other sets of information can be used, if the required degree of certainty can be achieved.

The anti-virus detection module may be used to check archive files on a host computer or in transit across a network. It is only necessary for the anti-virus detection module to have access to the file data.

According to one embodiment, the detection process starts with a computer file, in some form, being presented to the anti-virus detection module. The anti-virus detection module examines the file to determine whether it is an archive file. This may be done in two stages.

In one embodiment, the file is first examined on the assumption that it is an undamaged, complete archive. For each archive type of interest, relevant locations in the file are checked for data that would indicate that the file is an archive of that type. These may be locations containing codes intended to identify the archive type, or they may be locations where identifiable data intended for some other purpose is stored.

If the first test shows a negative result, then the file may be further examined on the assumption that it is damaged. As an example, common types of damage would be the removal of the beginning of the file, removal of the end of the file or corruption of data within the file.

In one embodiment, the second stage examination assumes that the file is damaged, and that the damage has made the data used for identification unreadable. For each archive type, the file is checked for secondary identification bytes that may be at a known location or may need to be searched for. If the file is not identified as a known archive at this point, processing by the anti-virus module may be terminated. However, if the file is found to be an archive, the anti-virus module may then proceed to check one or more files contained within the archive. For each file in the archive, there is typically a block of data describing the contained file. This data block is usually stored as a header at the beginning of each archived file, or such data blocks may be stored together in a central directory, or both.

Figure 1:
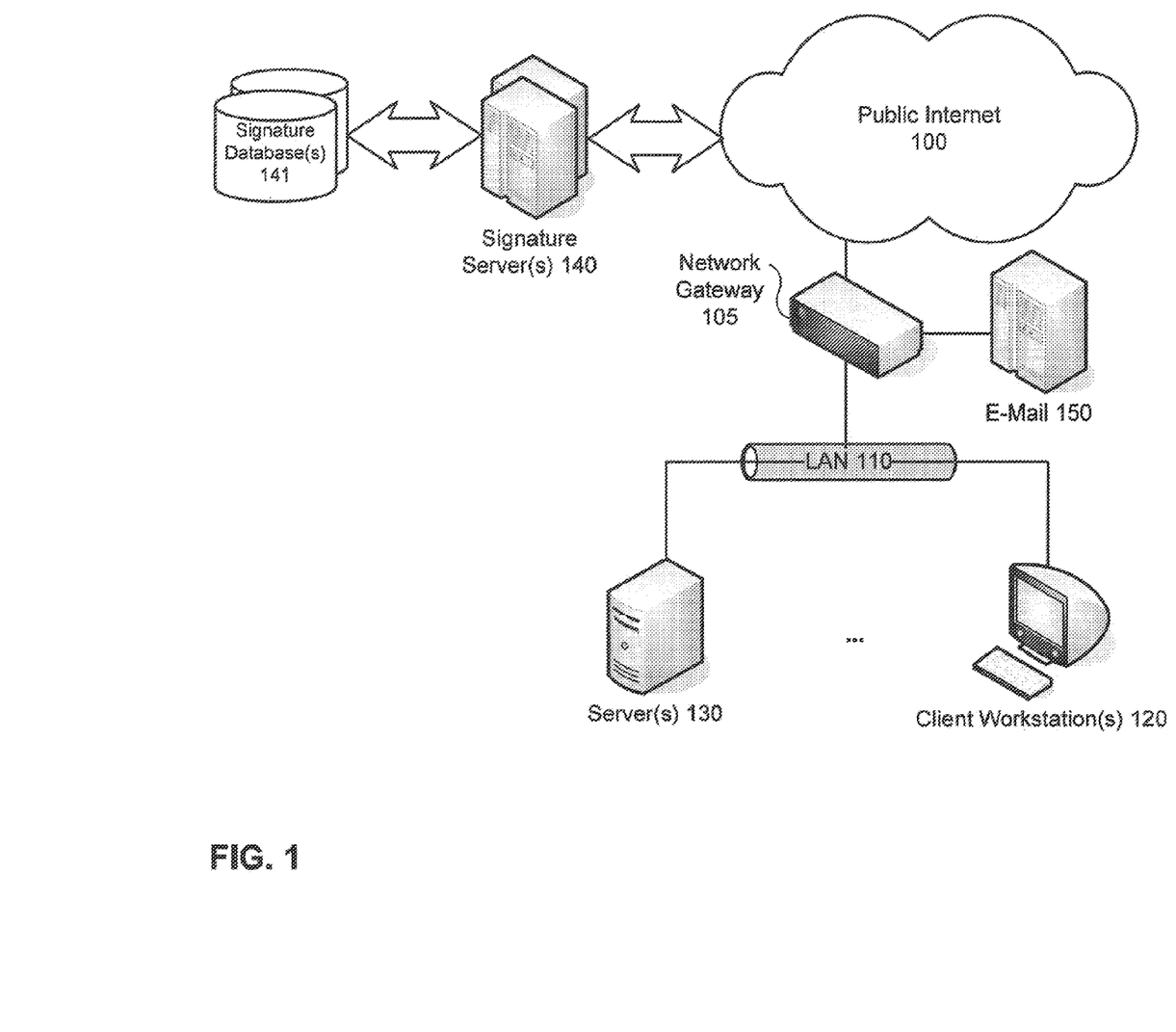
FIG. 1 is a block diagram conceptually illustrating a simplified network architecture in which embodiments of the present invention may be employed.

FIG. 1 is a block diagram conceptually illustrating a simplified network architecture in which embodiments of the present invention may be employed. In this simple example, one or more remote signature servers 140 are coupled in communication with a network gateway 105, which incorporates various novel archive scanning methodologies that are described further below, via the public Internet 100. In the present example, the network gateway 105 is also coupled to an e-mail server 150 from which and through which client workstations 120 residing on the local area network (LAN) 110 may retrieve and send email correspondence. Also residing on the LAN are one or more servers 130.

In the exemplary network architecture of FIG. 1, the signature servers 140 are coupled in communication with one or more signature databases 141. The signature databases 141 store identification data or detection signatures, providing a high probability of identifying known malware files. In one embodiment, the detection signatures are generated for known malware files, either directly from the malware file or from an archive containing the file. When generating a detection signature directly from the known malware file, file properties that can be found in the headers of the types of archives to be scanned are used. For example, the file size and a hash function can be used if these are available within the headers of the archive types of interest. When generating a detection signature from an archive, the archive header for the known malware file is located within the archive and selected data, e.g., one or more of a hash value of the contained malware file, the size of the contained malware file in compressed form and the size of the contained malware file in uncompressed form, from the header may be used to generate the detection signature. Various other sets of identification data may be used so long as the desired degree of certainty of correct identification is achieved.

According to one embodiment, the network gateway 105 periodically or responsive to a predetermined event, such as the existence of new signatures in the signature databases 141, updates a local stored copy of the signatures to allow archive file scanning to be performed locally. In alternative embodiment, archive files may be sent to the signature servers 140 for scanning.

According to one embodiment, the network gateway 105 intercepts communications between the client workstations 120 and the e-mail server 150 and performs scanning of archive files and potentially other traditional anti-virus detection and content filtering. In alternative embodiments, the network gateway 105 may also check archive files residing on a hard drive of client workstations 120 and/or the one or more servers 130.

Figure 2:
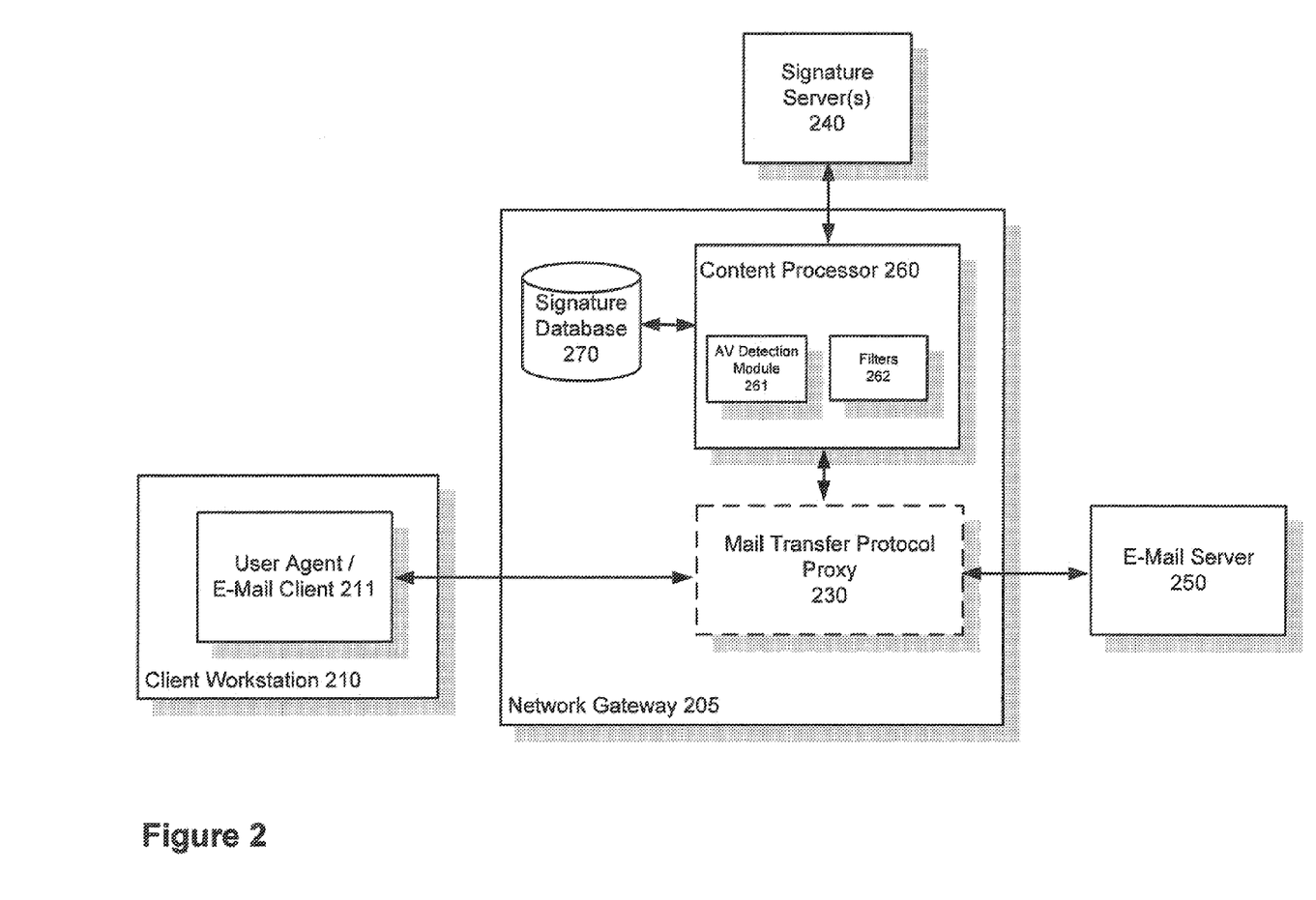
FIG. 2 is a block diagram conceptually illustrating interaction among various functional units of a network gateway with a client workstation and an email server in accordance with an embodiment of the present invention.

FIG. 2 is a block diagram conceptually illustrating interaction among various functional units of a network gateway 205 with a client workstation 210 and an e-mail server 250 in accordance with an embodiment of the present invention.

While in this simplified example, only a single client workstation, i.e., client workstation 210, and a single e-mail server, i.e., e-mail server 250, are shown interacting with the network gateway 205, it should be understood that many local and/or remote client workstations, servers and e-mail servers may interact directly or indirectly with the network gateway 205 and directly or indirectly with each other.

According to the present example, the network gateway 205, which may be a virtual or physical device, includes three high-level interacting functional units, a mail transfer protocol proxy 230, a signature database 270 and a content processor 260. In one embodiment, the mail transfer protocol proxy 230 is a transparent proxy that implements handlers for Simple Mail Transfer Protocol (SMTP) or Extended SMTP (ESMTP) commands/replies relevant to the performance of content filtering activities and passes through those not relevant to the performance of content filtering activities. In one embodiment, the mail transfer protocol proxy 230 subjects both incoming e-mail attachments and outgoing e-mail attachments to scanning by the content processor 260 In other embodiments, archive scanning may only be applied to incoming e-mail attachments.

In the present example, the signature database 270 represents a local copy of all or a subset of detection signatures stored in signature databases 141. In one embodiment, the content processor 260, periodically queries the signature servers 240 to determine if the signature database 270 is up-to-date and if not requests a current set of detection signatures from the signature servers 240. Alternatively, the signature servers 240 may push updated detection signatures to the content processor 260.

According to present example, the mail transfer protocol proxy 230 is logically interposed between a user agent or e-mail client 211 executing on the client workstation 210 and the e-mail server 250. Notably, neither the e-mail messages nor there attachments need be stored locally on the network gateway 205 to support the archive scanning functionality described herein. For example, instead of the archive scanning process running responsive to a proxy, such as the mail transfer protocol proxy 230, the network gateway 205 may open a direct connection between the e-mail client 211 and the email server 250, and filter e-mail in real-time as it passes through.

According to one embodiment, the content processor 260 performs scanning of archive files attached to e-mail messages transferred between the e-mail client 211 and the e-mail server 250 and potentially performs other traditional antivirus detection and content filtering on data associated with the e-mail messages.

In one embodiment, the content processor 260 may proactively scan files stored on the client workstations 110 or the servers 130 by periodically initiating archive scanning or may perform content filtering and archive scanning responsive to external events (e.g., a request originating from software running on the client workstation 110, a request originating from software running on the one or more servers 130 and/or by a request originating from the mail transfer protocol proxy 230).

In the current example, content processor 260 includes a novel antivirus (AV) detection module 261 and one or more other filters 262. The AV detection module 261 may apply current or future virus detection methodologies, such as signature matching, scanning, integrity checking, interception, heuristic detection and the like, to determine the presence of malicious code in the data being scanned. According to the current example, the AV detection module 261, responsive to being presented with a file, determines whether the file is an archive and if so, as described further below with reference to FIG. 5 and FIG. 6, determines if any of the contained files match the detection signatures stored in the signature database 270. The one or more other filters 262 may perform filename pattern blocking, confidential information control and the like.

In one embodiment, the content processor 260 is an integrated FortiASIC™ Content Processor chip developed by Fortinet, Inc. of Sunnyvale, Calif. In alternative embodiments, the content processor 260 may be a dedicated coprocessor or software to help offload content filtering tasks from a host processor.

While in the present example, the mail transfer protocol proxy 230, the signature database 270 and the content processor 260 are all shown as residing within or as part of the same network device, in alternative embodiments one or more of the mail transfer protocol proxy 230, the signature database 270 and the content processor 260 may be located remotely from the other functional units. According to one embodiment, the hardware components and/or software modules that implement the mail transfer protocol proxy 230, the signature database 270 and the content processor 260 are generally provided on or distributed among one or more Internet and/or LAN accessible networked devices, such as one or more network gateways, firewalls, network security appliances, switches, bridges, routers, data storage devices, computer systems and the like. In one embodiment, the functionality of the separate functional units may be merged in various combinations. For example, the signature database 270 may be incorporated with the mail transfer protocol proxy 230 or the mail transfer protocol proxy 230 may be incorporated within the content processor 260.

For sake of illustration, various embodiments of the present invention are described in connection with a transparent SMTP or ESMTP proxy; however, such examples are not intended to limit the scope of the present invention. Rather, the methodologies described herein have applicability to other current and future mail transfer protocols generally and applicability to scanning archives stored on computer-readable media separate and apart from the e-mail context.

Figure 3:
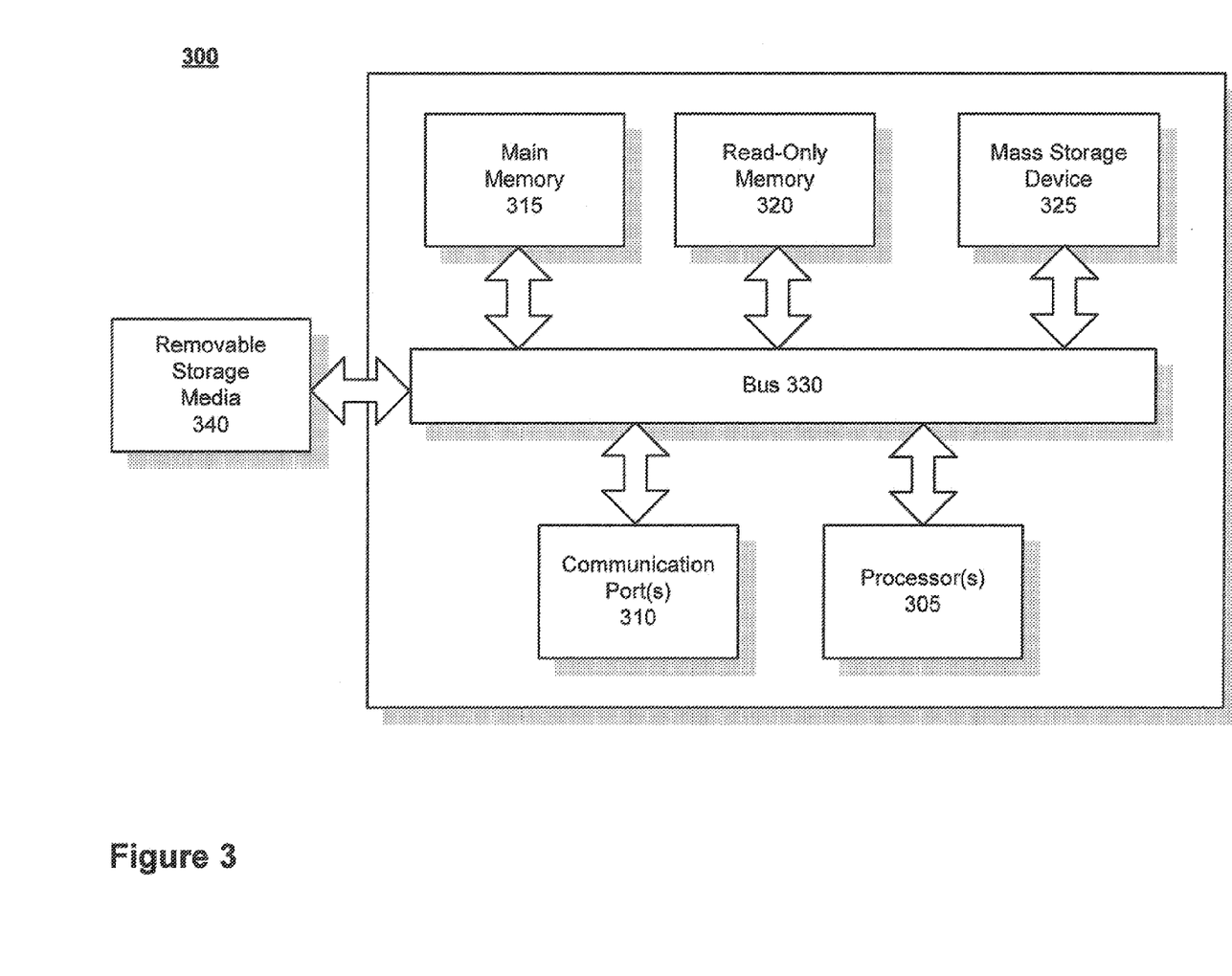
FIG. 3 is an example of a computer system with which embodiments of the present invention may be utilized.

FIG. 3 is an example of a computer system with which embodiments of the present invention may be utilized. The computer system 300 may represent or form a part of a network gateway, firewall, network security appliance, switch, bridge, router, data storage devices, server and/or other network device implementing one or more of the mail transfer protocol proxy 230, the signature database 270 and the content processor 260. According to FIG. 3, the computer system 300 includes one or more processors 305, one or more communication ports 310, main memory 315, read only memory 320, mass storage 325, a bus 330, and removable storage media 340.

The processor(s) 305 may be Intel® Itanium® or Itanium 2® processor(s), AMD® Opteron® or Athlon MP® processor(s) or other processors known in the art.

Communication port(s) 310 represent physical and/or logical ports. For example communication port(s) may be any of an RS-232 port for use with a modem based dialup connection, a 10/100 Ethernet port, or a Gigabit port using copper or fiber. Communication port(s) 310 may be chosen depending on a network such a Local Area Network (LAN), Wide Area Network (WAN), or any network to which the computer system 300 connects.

Communication port(s) 310 may also be the name of the end of a logical connection (e.g., a Transmission Control Protocol (TCP) port or a Universal Datagram Protocol (UDP) port). For example communication ports may be one of the Well Know Ports, such as TCP port 25 or UDP port 25 (used for Simple Mail Transfer), assigned by the Internet Assigned Numbers Authority (IANA) for specific uses.

Main memory 315 may be Random Access Memory (RAM), or any other dynamic storage device(s) commonly known in the art.

Read only memory 320 may be any static storage device(s) such as Programmable Read Only Memory (PROM) chips for storing static information such as instructions for processors 305.

Mass storage 325 may be used to store information and instructions. For example, hard disks such as the Adaptec® family of SCSI drives, an optical disc, an array of disks such as RAID, such as the Adaptec family of RAID drives, or any other mass storage devices may be used.

Bus 330 communicatively couples processor(s) 305 with the other memory, storage and communication blocks. Bus 330 may be a PCI/PCI-X or SCSI based system bus depending on the storage devices used.

Optional removable storage media 340 may be any kind of external hard-drives, floppy drives, IOMEGA® Zip Drives, Compact Disc-Read Only Memory (CD-ROM), Compact Disc-Re-Writable (CD-RW), Digital Video Disk (DVD)-Read Only Memory (DVD-ROM), Re-Writable DVD and the like.

Figure 4:
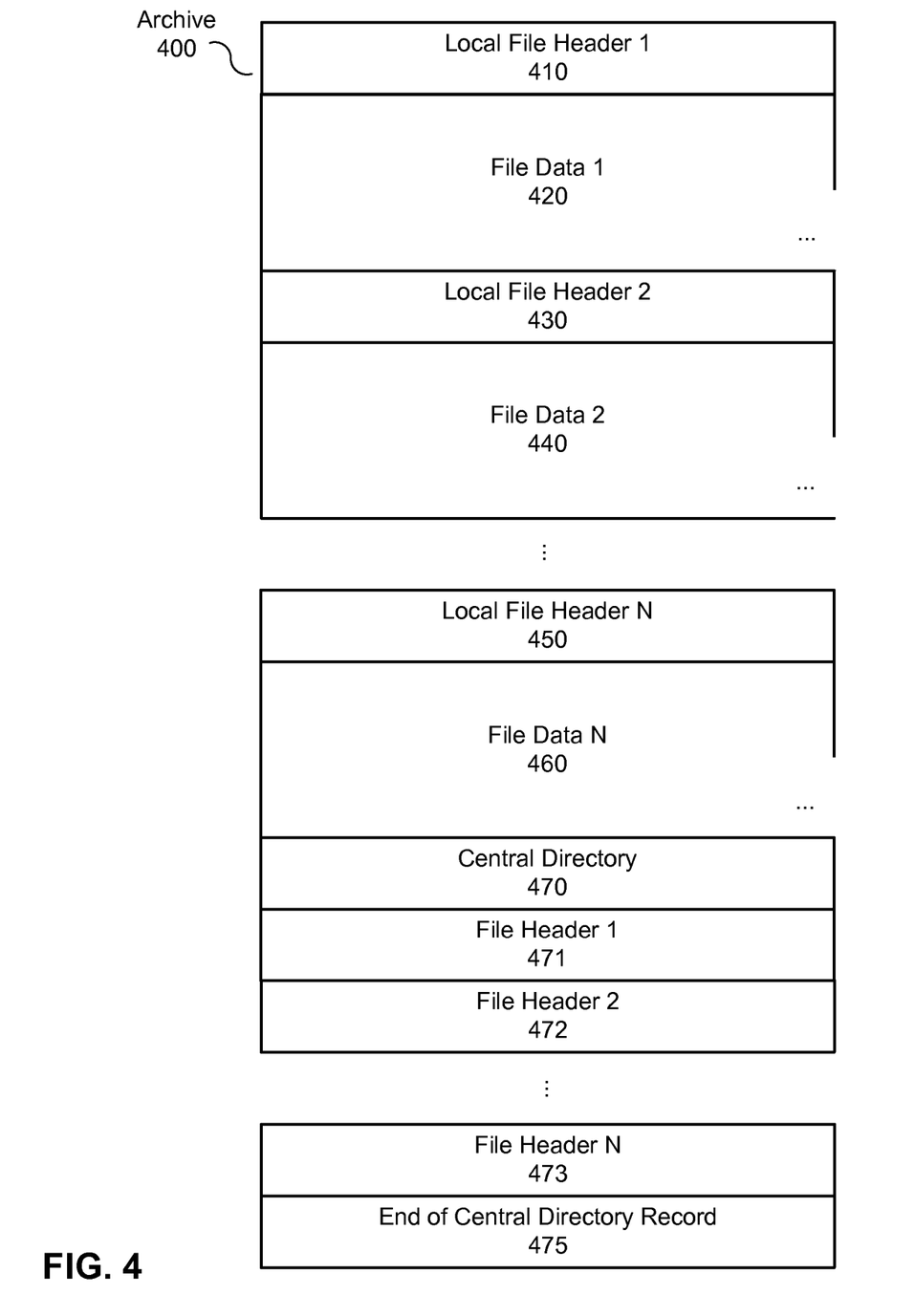
FIG. 4 is a high-level conceptual illustration of the overall structure of an archive file.

FIG. 4 is a high-level conceptual illustration of the overall structure of an archive file 400. In order to detect encrypted and/or compressed malware contained files rapidly and accurately without decrypting and/or uncompressing such files, certain pieces of information contained within the containing file, i.e., the archive, is extracted and compared with corresponding information for known undesired files as described further below. Before delving into various anti-virus processing approaches, it is helpful to have an overview of the general structure of an archive.

In the present example, the archive file 400 is a zip archive and includes (i) one or more local file headers, i.e., local file header 1 410, local file header 2 430 and local file header N 450; (ii) corresponding file data, i.e., file data 1 420, file data 2 440 and file data N 460, respectively, immediately following the local file headers; (iii) a central directory 470 containing file headers, i.e., file header 1 471, file header 2 472 and file header N 473; and (iv) an end of central directory record 475 marking the end of the central directory.

According to one embodiment, whether the file under examination is an archive and if so the type of archive is initially unknown. The first local file header, i.e., local file header 1 410 may be examined to determine the existence of signature bytes (not shown) indicative of they type of archive. For example, the first four bytes of a zip archive are hexadecimal 50 4B 03 04. If these bytes are found in local file header 1 410, then it can be confirmed that the file under examination is a zip archive.

Continuing with the present example, according to the zip documentation, i.e., PKWARE, Inc., ".ZIP File Format Specification," Version 6.3.1, Apr. 11, 2007, which is hereby incorporated by reference in its entirety for all purposes, the authoritative record in a zip file is the central directory 470 at the end of the archive 400. Information in the end of central directory record 475 can be used to locate the start of the central directory 470. According to one embodiment, information in the file headers may then be used to locate the corresponding local file headers in the archive 400. Further details regarding certain fields of the file headers and the end of central directory record 475 are provided below.

Figure 5:
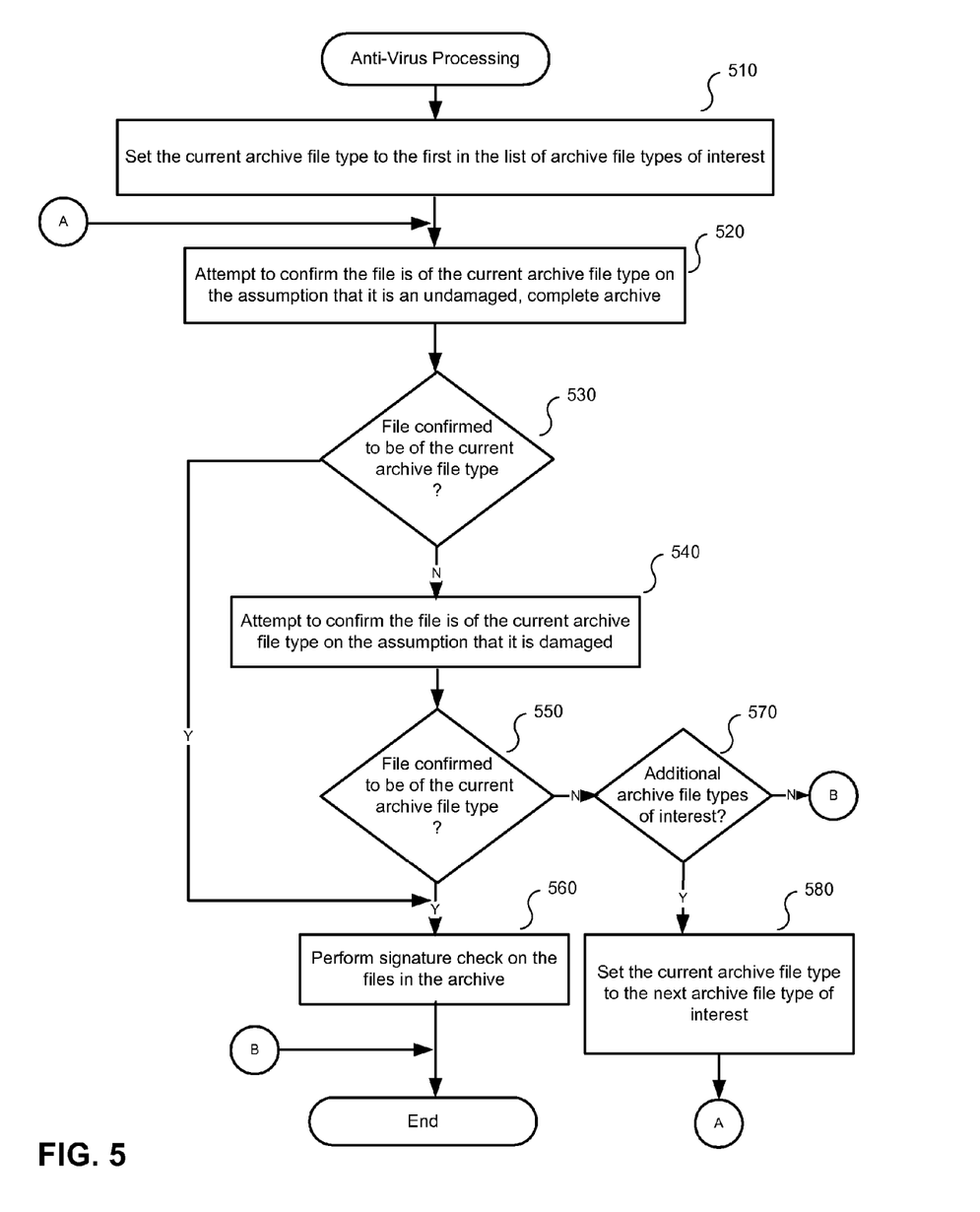
FIG. 5 is a high-level flow diagram illustrating anti-virus processing of archive files in accordance with an embodiment of the present invention.

FIG. 5 is a high-level flow diagram illustrating anti-virus processing of archive files in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

According to the present example, it is assumed the AV detection module, such as AV detection module 261, has been requested to perform an anti-virus scan of an identified file of interest. As indicated above, the file of interest may be an attachment of an inbound or outbound e-mail message or it may represent a file stored on a mass storage device associated with a client workstation or server, presented to the AV detection module as part of a periodic scan of stored files.

Depending upon the particular implementation, a network device, such as network gateway 105 or 205 may be configured to identify and scan one or more types of archive files. The particular archive files for which the network device is configured to process may be identified in a list of archive file types of interest.

Notably, for sake of simplicity and for purposes of illustration, various steps of the process may be described with reference to the zip archive file format. However, use of the zip archive file format as an example is not intended to limit the generality of the methodologies described herein as they are broadly applicable to various other archive types.

In the present example, anti-virus processing of a file at issue commences with block 510 in which a current archive file type is set to the first archive file type in the list of archive file types of interest. An iterative loop is thereby established to cycle through each of the archive file types of interest in an attempt to confirm the file at issue is a recognized archive type.

At block 520, an attempt is made to confirm the file at issue is of the current archive file type and based on the assumption that the file at issue is an undamaged and complete archive. Each archive format may have (i) its own specific mechanism used to identify itself as an archive of the particular archive format; or (ii) a particular usage model or format that while not intended to identify itself as a particular archive type, may still be used to ascertain the archive type. Relevant locations in the file at issue are checked for one or more primary identification bytes that would indicate the file at issue is an archive of the current archive file type. These relevant locations may be locations containing codes intended to identify the archive type or they may be locations where identifiable data intended for some other purpose is stored. For example, as discussed above, the first four bytes of a zip archive are hexadecimal 50 4B 03 04. If this hexadecimal value is found at the beginning of the file at issue, then the remainder of the anti-virus archive scanning process can proceed based on the particulars of a zip archive. Consequently, in an embodiment in which a zip archive is one of the archive file types of interest, the first four bytes of the file at issue are compared to hexadecimal 50 4B 03 04.

At decision block 530, if the file at issue is confirmed to be of the current archive file type, then processing continues with block 560; otherwise processing branches to block 540.

At block 540, the file at issue could not be confirmed to be of the current archive file type under the assumption that the file of interest is an undamaged and complete archive. Therefore, according to the present example, a second stage examination proceeds to evaluate the file of interest on the assumption that is it damaged and that the damage has made the one or more primary identification bytes unreadable. Common types of damage include the removal of the beginning of the archive, removal of the end of the archive or corruption of data within the archive. According to various embodiments of the present invention, this second stage of examination assesses the file at issue for one or more secondary identification bytes that may be at a known location or may need to be searched for. Again, using a zip archive file format as an example, damage to a zip archive may result in the absence of all or a part of the central directory 470. In such a case, to the extent the evaluation process relies upon information in the end of central directory record 475 to locate the beginning of the central directory, the process would terminate unexpectedly with an indication that the end of central directory record 475 was not found.

Generally, if the beginning of the file is damaged, the evaluation process can perform the second stage examination with reference to the end of the file; and if the end of the file is damaged, the evaluation process can perform the second stage examination with reference to the beginning of the file at issue. Continuing under the assumption that the current archive file type is zip archive, the evaluation process may continue by scanning the file at issue for local file headers instead of identifying the offsets of the local file headers with reference to information in the file headers of the central directory 470. The evaluation process having found the central directory to be unusable, makes the assumption that the end of the file or the end of central directory record 475 has been damaged. In one embodiment, the evaluation process may start scanning the file at issue from the beginning of the file and check for the first local file header. Each local header represents one compressed file, and includes the compressed size for that file. The evaluation process may simply move ahead within the file by the compress size of the currently located compressed file to find the next local header.

If on the other hand, the first four bytes are missing in the case of a zip archive, the evaluation process may look at the end of the file for the end of central directory record 475, which starts with the signature hex 50 4B 05 06. This will normally be 22 bytes from the end of the zip archive; however, an unknown length comment could follow, so the evaluation process may need to search back some distance. In one embodiment, the evaluation process may always scan the file at issue to evaluate both sets of headers (e.g., the local file headers and the central directory file headers. One useful aspect of checking header information is that even if only part of an undesired file code is left in the damaged archive, the evaluation process can still detect that it was there. This allows a warning to be provided to the user that the archive and/or its source are suspect.

At decision block 550, a determination is made regarding whether the file at issue is confirmed to be of the current archive file type based on the current set of assumptions (i.e., the file at issue is a damaged or incomplete archive file). If the file at issue cannot be confirmed to be of the current archive file type, then the evaluation process continues with decision block 570. If the file at issue has been confirmed to be of the current archive file type, then processing continues with block 560.

At decision block 570, if there are additional archive file type of interest, then the process continues with block 580 in an attempt to attempt to confirm the file at issue is of one of the remaining archive file types of interest. Otherwise, all archive file types of interest have been exhausted, the file at issue has not been confirmed to be an archive file and the anti-virus processing terminates.

At block 580, the file at issue has yet to be confirmed to be an archive file based on those of the archive file types of interest already iterated through and it has been further determined that one or more archive file type of interest remain to be tried. Therefore, according to the present example, the current archive file type is set to the next archive file type in the list or archive file types of interest and the process loops back to block 520.

At block 560, the file at issue has been confirmed to be an archive file of the current archive file type, either (i) undamaged and complete or (ii) damaged or incomplete. In any event, at this point, the anti-virus processing continues by performing a signature check on the one or more contained files of the archive.

Figure 6:
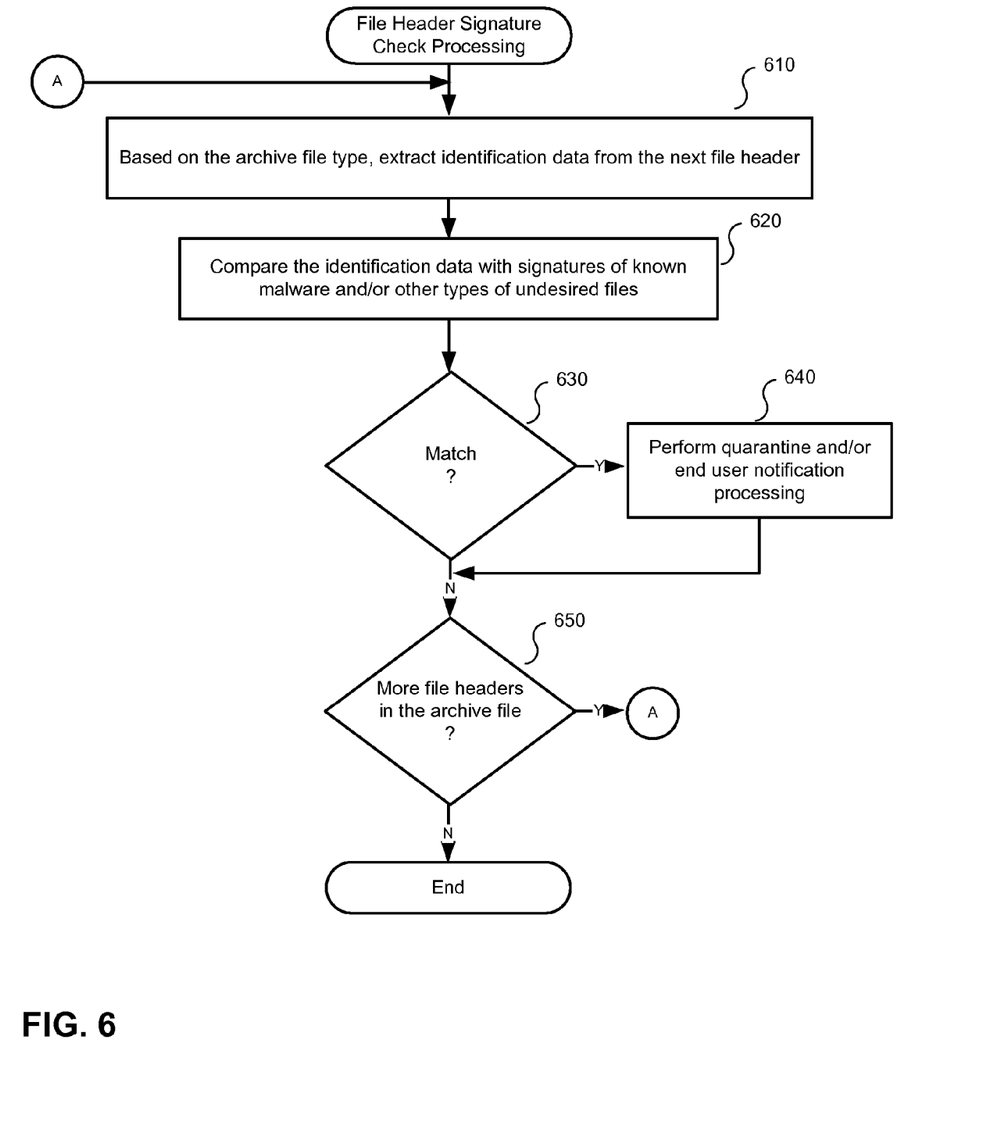
FIG. 6 is a flow diagram illustrating archive file header signature check processing in accordance with an embodiment of the present invention.

FIG. 6 is a flow diagram illustrating archive file header signature check processing in accordance with an embodiment of the present invention. As mentioned with reference to FIG. 5, depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

Again, for purposes of illustration, various steps of the process may be described with reference to the zip archive file format. However, use of the zip archive file format as an example is not intended to limit the generality of the methodologies described herein.

According to the present example, upon commencement of this archive file header signature check process, it has previously been confirmed that the file at issue is of the current archive file type. At block 610, based on the current archive file type identification data may be extracted from the current file header being processed. The type, form and number of identification data may be different for different archive types. For example, if the current archive type includes hash values and sizes of the contained files in compressed format, it is preferable according to one embodiment, to use that information for purposes of identifying the contained files with a high degree of probability. However, various other identification data may be used. For example, a hash value in conjunction with the size of the contained file in uncompress format has also been found to be sufficient. Additionally, various other combinations of properties may be used. In one embodiment, at least two properties are used; however, in some circumstances the hash alone may be used. The most common useful properties are the hash of the uncompressed file, the uncompressed length, the compressed length and file name. Digital signatures are also present in some of archive file formats. The compression type is needed with some of the compressed file information. For purposes of illustration, the following presents an exemplary list of potential identification data:

uncompressed hash with compressed size
    uncompressed hash with uncompressed size compressed size, uncompressed size and compression type
file name with compressed size and compression type
digital signature and compressed size Naturally, there is always more information being added into these archive file formats. Consequently, if the particular types or combinations of identification data discussed above are not present in the particular archive file format, other sets of information can be used if the required degree of certainty can be achieved.

At block 620, the extracted identification data is compared to the detection signatures of known malware and/or other types of undesired files. In one embodiment, the extracted identification data is compared against the detection signatures stored in the local signature database 270.

At block 630, it is determined if the extracted identification data match one or more of the detection signatures. If so, processing continues with block 640. If the extracted identification data of the current file header being checked does not match a detection signature of a known malware contained file or other undesired contained file, then the contained file associated with the current file header is deemed to be clean and processing continues with decision block 650.

At block 640, based on a comparison of the identification data associated with the current file header against detection signatures associated with known malware and/or other types of undesired files, the contained file corresponding to the current file header has been determined to be malware or another type of undesired file. Responsive thereto, various defensive actions may be undertaken. According to the present example, the archive as a whole may be quarantined and/or the end user responsible for creation of the archive may be notified. In alternative embodiments, the offending contained file may be removed and the archive may be regenerated without the offending contained file. If the file at issue is an e-mail attachment, the e-mail may be allowed to proceed after removing the archive. The originator and/or the recipient may further be notified of the defensive action taken and/or provided with general or specific information regarding the nature of the malware or undesired file detected. Furthermore, to facilitate geographic and/or statistical tracking of such events, the network device may report the detection event to a central repository.

Figure 7A:
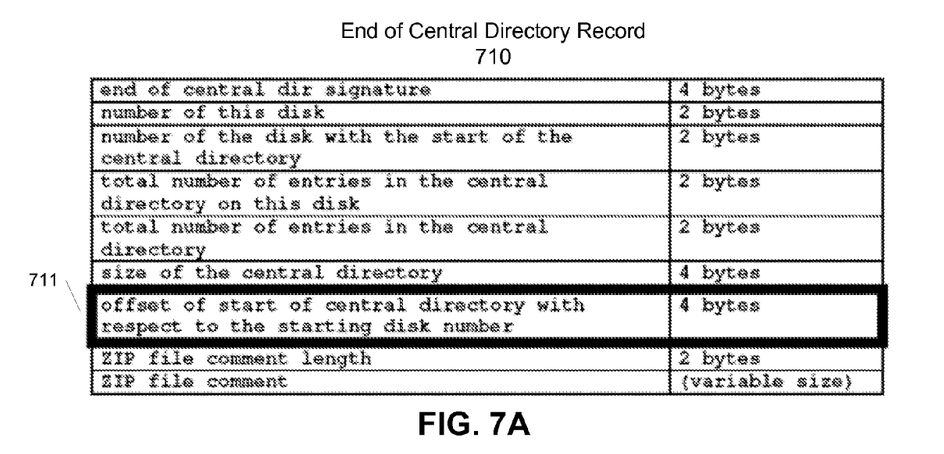
FIG. 7A is a listing of information contained in the end of central directory record of a zip archive.

At decision block 650, it is determined if more file headers remain to be processed in the archive file at issue. For example, assuming the archive file at issue is a zip archive and the file headers of the central director 470 are being scanned, if the next portion of data is not the end of central directory record 475, then additional file headers are deemed to remain for processing and processing loops back up to block 610. In some embodiments, all file headers of the archive are checked regardless of the outcome with respect to earlier file headers. In alternative embodiments, if a contained file has already been identified as being malware or another undesired file, checking of remaining file headers may be deemed unnecessary and file header signature check processing may terminate after such identification FIG. 7A is a listing of information contained in the end of central directory record 710 of a zip archive. While thought to be self evident in view of the zip documentation, for purposes of completeness and for purposes of providing a more complete understanding of embodiments in which zip archives are among the archive types of interest, it is instructive to point out the offset of the start of the central directory with respect to the starting disk number 711 (a 4 byte field) is located at bytes 17-20 of the end of central directory record 710.

Figure 7B:
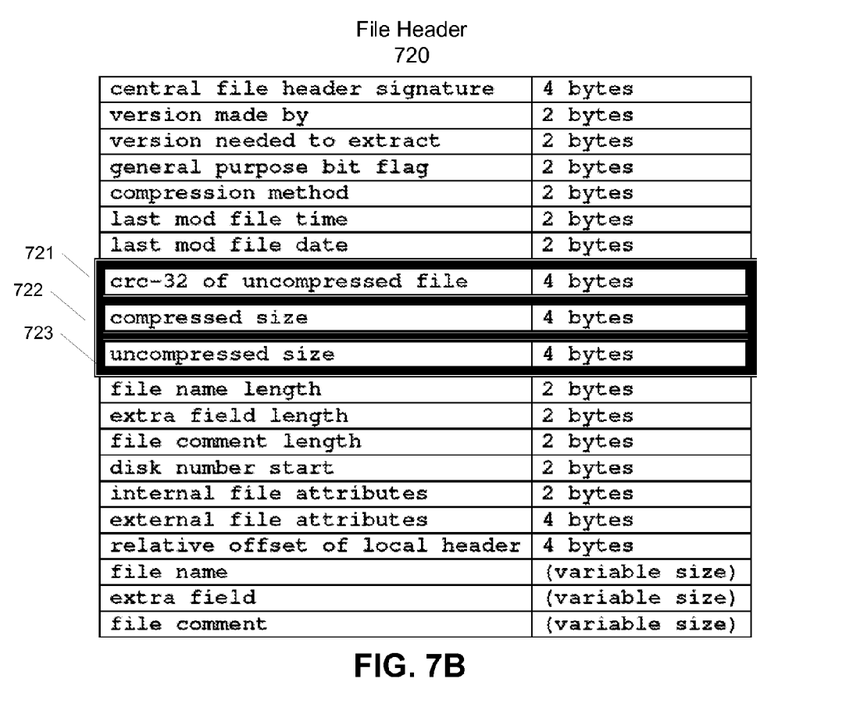
FIG. 7B is a listing of information contained in a file header of a central directory of a zip archive.

FIG. 7B is a listing of information contained in a file header 720 of a central directory of a zip archive. While thought to be self evident in view of the zip documentation, for purposes of completeness and for purposes of providing a more complete understanding of embodiments in which zip archives are among the archive types of interest, a table illustrating the zip file header format is provided. Notably, the zip archive format includes a hash value (i.e., a 32-bit cyclic redundancy checksum (CRC-32) value 721) and both an indication of the size of the contained file in compressed format 722 and an indication of the size of the contained file in uncompressed format 723.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A computer-implemented method comprising:
   without decrypting and without decompressing contents of an archive file:
      identifying, by an anti-virus detection module running on a computer system, a type and associated structure of the archive file by examining (i) one or more primary identification bytes stored within the archive file that contain information intended to identify the type of the archive file or (ii) one or more secondary identification bytes stored within the archive file that contain identifiable data intended for a purpose other than identifying the type of the archive file;
      based on the identified type and the associated structure, obtaining, by the anti-virus detection module, descriptive information from the archive file describing one or more contained files within the archive file;
      evaluating, by the anti-virus detection module, the descriptive information for each of the one or more contained files to determine if any of the one or more contained files are malicious or undesired computer files by comparing the descriptive information to signatures of known malicious or undesired computer files; and
      attempting to prevent, by the anti-virus detection module, any of the one or more contained files determined to be a malicious or undesired computer file from being opened.

2. The method of claim 1, wherein the one or more primary identification bytes comprise four bytes represented in hexadecimal form as follows: 50 4B 03 04.

3. The method of claim 1, wherein said identifying, said obtaining and said evaluating are performed in real-time as the archive file is in transit across a network.

4. The method of claim 3, wherein the archive file is an attachment of an email message.

5. The method of claim 4, further comprising removing from the archive file any of the one or more contained files determined to be malicious or undesired computer files.

6. The method of claim 3, wherein transfer of the archive file is blocked if any of the one or more contained files are determined to be malicious or undesired computer files.

7. The method of claim 1, wherein the archive file is held in a memory buffer during said obtaining, by the anti-virus detection module, descriptive information from the archive file.

8. The method of claim 1, wherein the archive file comprises a self extracting archive, an executable installer file, or an installation archive.

9. The method of claim 1, wherein the one or more contained files are one or more of encrypted, password-protected and compressed.

10. The method of claim 1, wherein the descriptive information includes a hash value for each of the one or more contained files in a contained version of the one or more contained files.

11. The method of claim 1, wherein the descriptive information includes a hash value for each of the one or more contained files in an extracted version of the one or more contained files.

12. The method of claim 1, wherein the descriptive information includes one or both of a length of an extracted version of each of the one or more contained files and a length of a contained version of each of the one or more contained files.

13. The method of claim 1, wherein said evaluating, by the anti-virus detection module, the descriptive information is accomplished by determining how closely the descriptive information resembles corresponding information generally found in known or expected undesired files.

14. The method of claim 1, wherein said attempting to prevent, by the anti-virus detection module, any of the one or more contained files determined to be a malicious or undesired computer file from being opened comprises quarantining the malicious or undesired computer files.

15. The method of claim 1, further comprising responsive to determining the one or more contained files includes a malicious or undesired computer file, issuing an alert to a user or administrator indicating detection of the malicious or undesired computer file and describing any action taken.

16. The method of claim 1, where information about the malicious or undesired computer file and any action taken is entered into a log.

17. A computer-implemented method comprising:
receiving, by an anti-virus detection module running on a computer system, a damaged or incomplete archive file; and
without decrypting and without decompressing contents of the damaged or incomplete archive file:
identifying, by the anti-virus detection module, a type and associated structure of the damaged or incomplete archive file by assuming each of a plurality of possible archive file types in turn and searching all of or certain parts of the damaged or incomplete archive file for descriptive information consistent with a current archive file type;
based on the identified type and the associated structure, obtaining, by the anti-virus detection module, descriptive information from the damaged or incomplete archive file describing one or more contained files within the damaged or incomplete archive file;
evaluating, by the anti-virus detection module, the descriptive information for each of the one or more contained files to determine if any of the one or more contained files are malicious or undesired computer files by comparing the descriptive information to signatures of known malicious or undesired computer files; and
attempting to prevent, by the anti-virus detection module, any of the one or more contained files determined to be a malicious or undesired computer file from being opened.

18. The method of claim 17, wherein the plurality of possible archive file types include one or more of ZIP, RAR, 7-Zip, 7zX, WinACE, ARC, ALZip, ARJ, Cabinet, Compact Pro, Disk Archiver, DiskDoubler, DGCA, Disk Image, GCA, WinHKI, ICE, Jar, KGB Archiver, LHA, LZX, Part Image, PAQ, PeaZip, PIM, RK, WinRK, sea, StuffIt, SQX, tar with gzip, compress, bzip2, or lzma, UHarc, Universal Image Format, zoo and Zzip.

19. The method of claim 17, wherein said identifying, said obtaining and said evaluating are performed in real-time and the archive file is an attachment of an email message.

20. The method of claim 17, wherein the archive file comprises a self extracting archive, an executable installer file, or an installation archive.

21. The method of claim 17, wherein the one or more contained files are one or more of encrypted, password-protected and compressed.

22. The method of claim 17, wherein the descriptive information includes a hash value for each of the one or more contained files in a contained version of the one or more contained files.

23. The method of claim 22, wherein the descriptive information includes a length of the contained version of each of the one or more contained files.

24. The method of claim 17, wherein the descriptive information includes a hash value for each of the one or more contained files in an extracted version of the one or more contained files.

25. The method of claim 24, wherein the descriptive information includes a length of the extracted version of each of the one or more contained files.

26. The method of claim 17, wherein said evaluating, by the anti-virus detection module, the descriptive information is accomplished by determining how closely the descriptive information resembles corresponding information generally found in known or expected undesired files.

* * * * *